United States Patent [19]

D'Hont

[11] Patent Number: 5,557,279
[45] Date of Patent: Sep. 17, 1996

[54] UNITARILY-TUNED TRANSPONDER/SHIELD ASSEMBLY

[75] Inventor: Loek D'Hont, Almelo, Netherlands

[73] Assignee: Texas Instruments Incorporated, Dallas, Tex.

[21] Appl. No.: 584,724

[22] Filed: Jan. 11, 1996

Related U.S. Application Data

[63] Continuation of Ser. No. 127,910, Sep. 28, 1993, abandoned.

[51] Int. Cl.⁶ .................................................... G01S 13/74
[52] U.S. Cl. .................... 342/42; 342/51; 340/572; 340/988
[58] Field of Search .................. 342/51, 42; 340/572, 340/988

[56] References Cited

U.S. PATENT DOCUMENTS

| | | |
|---|---|---|
| 3,453,634 | 7/1969 | Gilbert ..................................... 343/788 |
| 4,101,899 | 7/1978 | Jones, Jr. et al. ........................ 343/788 |
| 4,876,709 | 10/1989 | Rogers et al. ............................ 379/61 |
| 5,172,121 | 10/1994 | Beecher .................................... 342/51 |

FOREIGN PATENT DOCUMENTS

| | | |
|---|---|---|
| 0040544 | 11/1981 | European Pat. Off. . |
| 0409343 | 1/1991 | European Pat. Off. . |
| WO-A-8907347 | 8/1989 | WIPO . |

Primary Examiner—J. Woodrow Eldred
Attorney, Agent, or Firm—Brian C. McCormack; James C. Kesterson; Richard L. Donaldson

[57] ABSTRACT

This invention relates to a shielded transponder 12 which is capable of being mounted on any surface, whether ferromagnetic or not. The transponder includes an antenna which in use is susceptible to detuning as a result of being mounted on a ferromagnetic surface. The shield 16 prevents this detuning and enables the transponder 12 to be mounted on any surface. The shield 16 may produce slight detuning, however, this can be compensated for by pretuning of the transponder.

9 Claims, 1 Drawing Sheet

UNITARILY-TUNED TRANSPONDER/SHIELD ASSEMBLY

This application is a Continuation of application Ser. No. 127,910 filed Sep. 28, 1993 now abandoned.

CROSS-REFERENCE TO RELATED PATENTS

The following commonly-assigned patents and/or applications are hereby incorporated by reference:

| Pat No./Ser. No. | Filing Date | TI Case No. |
| --- | --- | --- |
| GB 93115619.4 | 9/28/93 | TI-16817 |
| 5,351,052 | 6/28/93 | TI-17341 |
| 5,428,363 | 9/28/93 | TI-16815 |

BACKGROUND OF THE INVENTION

This invention relates to a transponder, for example, for use in Registration and Identification Systems.

Transponders or antennae may be used in registration and identification systems, for example, automatic vehicle identification systems. The antennae (which are generally tuned antenna) are typically positioned such that they can transmit and receive signals over a specific area.

An automatic vehicle identification system (AVI) is one in which a transponder is mounted on a vehicle and is capable of generating a signal unique to that vehicle. The signal can be detected by any appropriate monitoring means. Generally this will be an antenna system, for example, that described in our co-pending U.S. patent Ser. No. 08/127,860 filed Sep. 28, 1993 and having a priority date of Sep. 28, 1992. The antenna will receive and interpret the signal from the vehicle mounted transponder and may use the signal, for example, for automatically charging motorway tolls, allowing entry into restricted areas, crime prevention, speed monitoring, etc.

Very often, it is necessary to mount the transponder directly onto a metal surface such as a car, container, etc. This has the fundamental problem, however, that the transponder can be de-tuned by the metal surface.

Previous solutions have been to detune the tank circuit of the antenna with a predetermined reverse shift. However, the mounting tolerances are then very critical. For ferro-metallic contact surfaces direct contact to the metal surface would still not be possible and thus the transponder may protrude too much away from the surface. This is obviously undesirable. Another solution is to correct the transponder frequency after the actual mounting using a separate ferrite rod. This has the disadvantage of high costs due to time consuming installation. In addition, read deterioration can occur due to low Q-factor when mounting the transponder on ferro metallic surfaces. A further disadvantage which occurs is lowered magnetic efficiency from the transponder antenna itself, due to "short-circuiting" of the field lines.

One object of the present invention is to provide a system which overcomes at least some of the disadvantages of present systems.

SUMMARY OF THE INVENTION

According to one aspect of the present invention, there is provided a transponder for a recognition and identification system comprising an antenna having an insulative cover; and a shield of non-ferric material located between the antenna and any surface on which the antenna is to be mounted which shield is adapted to prevent de-tuning of the antenna in use.

This has the advantage that the non-ferric material prevents any ferromagnetic material from interfering with the reception and transmission of field lines from the antenna.

BRIEF DESCRIPTION OF THE DRAWINGS

Reference will now be made, by way of example, to the accompanying drawings, in which.

DETAILED DESCRIPTION OF THE DRAWINGS

Figure 1:
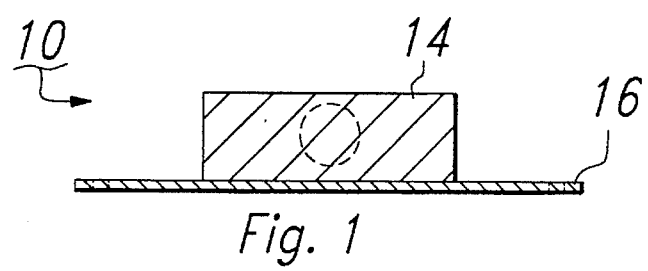
FIG. 1 is a cross-section of a front view of a transponder according to one aspect of the present invention.
Figure 2:
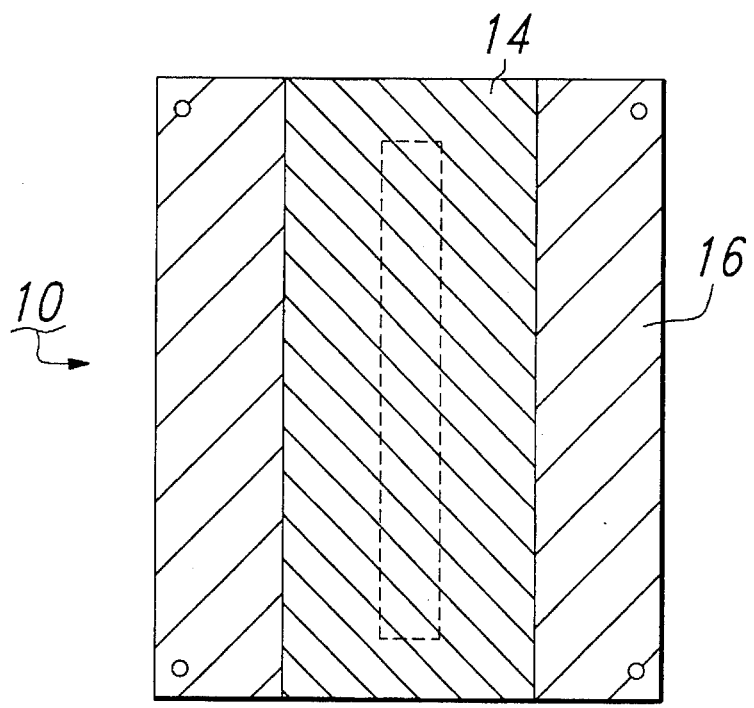
FIG. 2 is a cross-section of a top view of the FIG. 1 transponder.
Figure 3:
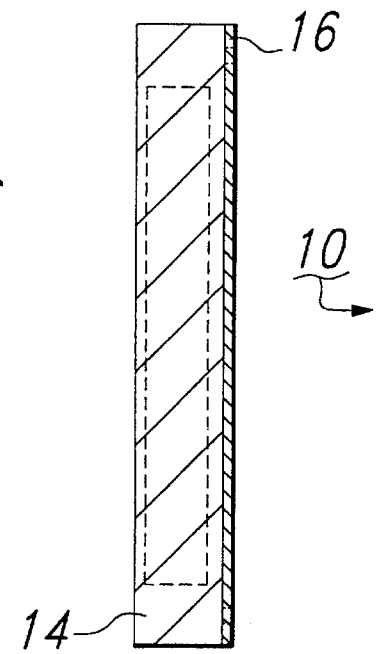
FIG. 3 is a cross-section of a side view of the transponder of FIGS. 1 and 2.

The transponder is shown generally at 10 and comprises a ferrite antenna (12) and transponder chip 13, covered with a plastic material 14. The antenna 12 may be alternatively formed of other suitable material such as, for example, magnetic material.

The antenna has circuitry associated with it, which can generate a resonance in the antenna and receive and process information. Part of this circuitry is known as a tank circuit 15 and forms part of the transponder. This is a section of resonant co-axial transmission line, or a tuned circuit, which accepts power from an oscillator and delivers it harmonic free to the load (the antenna in this case).

The transponder 10 further comprises an aluminum shield 16 the edges of which are substantially parallel to the transponder antenna. Other orientations of the shield relative to the antenna are possible and other non-ferrous metals such as copper, for example, may also be used for the shield.

The shield itself will cause a detuning on the transponder tank circuit, which is compensated for by correcting the initial inductivity of the transponder antenna in such a way that when the tank is counted mechanically to the shield, the transponder frequency is corrected to the operating frequency which is typically 134.2 kHz. In this case, the antenna is mounted 3 mm above the surface of the aluminum shield to produce the required pretuning. Clearly, for certain applications, other frequencies will be used. The shield will then prevent the tank from being detuned or lowered in Q-factor (quality factor) when mounted onto any other metal surface (ferrous-metal or non ferrous metallic). The shields arranged to face the metal surface of any container or the like on which the transducer is mounted. The shield may be the mounting bracket as well as a shield in certain circumstances.

The aluminum or copper used to make the shield is highly conductive and field lines falling on the shield are reflected away, thus preventing detuning of the antenna. If the shield were not in place, then the ferromagnetic material on which the transducer is mounted would interact with the tank circuit, thereby detuning the antenna.

When the shield is used, transponder mounting can be made directly to metal surfaces, without performance being affected. This widens the applications of the transponders practical usage. There is no constraint on the mounting surface any more, it can be of any nature. Also, time consuming frequency-corrections after installation are not necessary.

Since the Q-factor does not drop as much with aluminum, for example, as with other metals the read range of the transponder does not suffer and is typically about 2 m. In addition, the aluminum can actually shield the transponder from other metals which would have dropped the Q-factor further.

This transponder can be used in an AVI (Automatic Vehicle Identification) container transponder, Logistic automation in production processes, and any other area where Registration and Identification systems are targeted for large read range applications which are independent of the mounting surface.

The transponder can be used with the antenna system as described in U.S. Pat. No. 5,428,363 (TI-16815) with the antenna described in U.S. Pat. No. 5,428,363 filed Sep. 28, 1993 and having a priority date of Sep. 28, 1992 (TI-16817) or in the transponder system described in U.S. Pat. No. 5,351,052 (TI-17341).

What is claimed:

1. A transponder assembly for use with a recognition and identification system suitable for mounting on metal comprising:

a shield member formed of a non-ferrous material for mounting on a metal object;

an insulative support member mounted to said shield member; and a transponder having an antenna connected to a tank circuit, said transponder mounted on said support member and electrically isolated from said shield member, said shield member interacting with said tank circuit and said antenna such that the combination of said tank circuit, said antenna and said shield is tuned as a single unit to an operating frequency.

2. The transponder of claim 1, wherein the shield member comprises an aluminum metal sheet.

3. The transponder of claim 1, wherein the antenna comprises a ferrite antenna.

4. The transponder of claim 1, wherein said transponder and said shield are spaced about 3 mm and the operating frequency of transponder is about 134.2 KHz.

5. The transponder of claim 1, wherein the insulative support member comprises a plastics material.

6. The transponder of claim 1, wherein the shield member comprises a copper metal sheet.

7. A method of preventing detuning of a recognition and identification system transponder when mounted on metal comprising the steps of:

providing a shield member formed of a non-ferrous material and suitable for mounting on a metal object;

attaching an insulative support member to said shield member;

mounting a transponder having an antenna connected to a tank circuit on said insulative support and such that said transponder is electrically isolated from said shield member and such that the combination of said shield member, said antenna, and said tank circuit interact; and tuning said combination to said selected operating frequency.

8. The method of claim 7 further comprising the step of selecting said shield member from a non-ferrous material selected from the group consisting of copper and aluminum.

9. The method of claim 7 further comprising the step of selecting said operating frequency to be about 134.2 KHz.

* * * * *